W. F. GREGORY.
MARKING LINE.
APPLICATION FILED OCT. 22, 1919.

1,373,884.

Patented Apr. 5, 1921.

INVENTOR
WILLIAM F. GREGORY.

BY
Strong and Townsend
ATTORNEY

UNITED STATES PATENT OFFICE.

WILLIAM F. GREGORY, OF SAN FRANCISCO, CALIFORNIA, ASSIGNOR OF EIGHTY-FIVE PER CENT. TO CHARLES A. LEVY, OF NEWARK, NEW JERSEY, FIVE PER CENT. TO JOHN BOEGERSHAUSEN, OF SAN FRANCISCO, CALIFORNIA, AND TEN PER CENT. TO GRACE MOSHER, OF SAN FRANCISCO, CALIFORNIA.

MARKING-LINE.

1,373,884.      Specification of Letters Patent.    Patented Apr. 5, 1921.

Application filed October 22, 1919. Serial No. 332,553.

*To all whom it may concern:*

Be it known that I, WILLIAM F. GREGORY, a citizen of the United States, residing at San Francisco, in the county of San Francisco and State of California, have invented new and useful Improvements in Marking-Lines, of which the following is a specification.

This invention relates to a marking line and particularly to means for applying a transferable coloring material thereto.

One of the objects of the present invention is to provide a marking line adaptable and useful for various purposes, and particularly to provide means for automatically applying a transferable colored liquid to the same.

Another object of the invention is to provide a reel upon which the cord may be wound, a holder for the reel, a container in the holder for the reception of a coloring liquid, and means for applying the liquid to the line when it is being unreeled.

Further objects will hereinafter appear.

The invention consists of the parts and the construction, combination and arrangement of parts as hereinafter more fully described and claimed, having reference to the accompanying drawings, in which—

Figure 1:
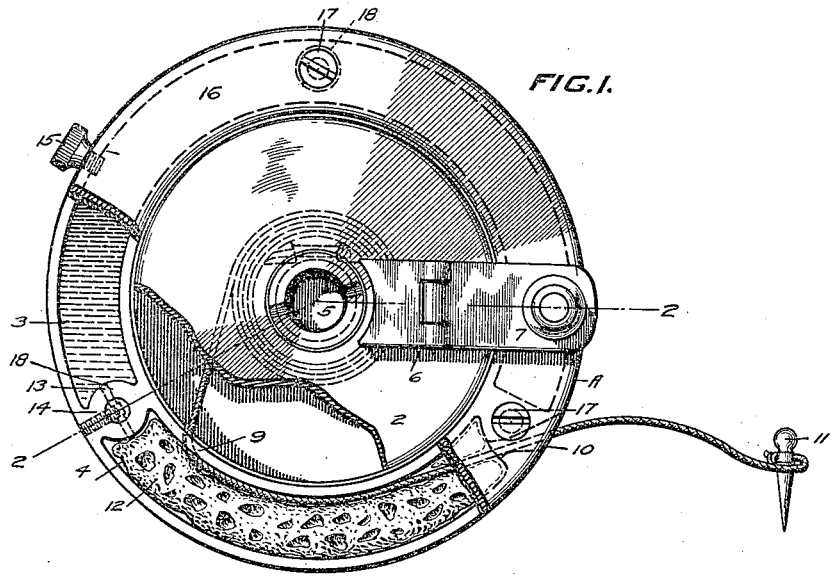
Figure 1 is a plan view of the reel, showing the line wound thereon and also showing portions of the reel structure in section.
Figure 2:
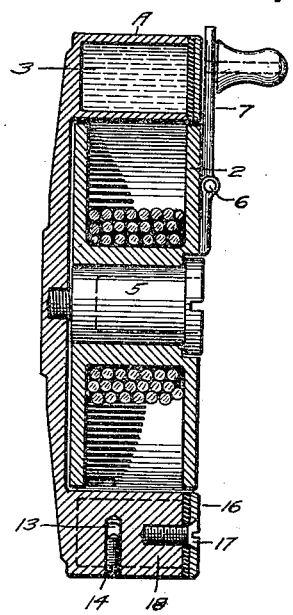
Fig. 2 is a cross section on line 2—2, Fig. 1.

Referring to the drawings in detail, A indicates a holder of cylindrical formation, in which is formed a central chamber for the reception of a reel such as shown at 2 and an exterior annular chamber which is divided into two sections, as shown at 3 and 4. Secured in the holder is a journal pin 5 upon which the reel is turnably mounted. Hingedly secured as at 6 on the exterior side of the reel, is a handle 7 which may be folded inwardly against the face of the reel when not in use. Secured to the hub portion of the reel is a marking line. This line is of suitable length and is wound about the reel, as shown in Figs. 1 and 2. The free end of the line passes through an opening 9 formed in the holder and enters the chamber 4. It passes through this chamber, as shown in Fig. 1 and finally out through an opening 10.

Secured on the free end of the line is a pin 11, the function of which will hereinafter be described, and placed within the chamber 4 is a sponge 12 to which a colored liquid contained in chamber 3 is delivered through a passage 13, the quantity of liquid escaping from the chamber 3 and into chamber 4, being regulated by means of a pointed screw or valve member 14. The inner end of the screw is pointed and is adapted to enter the passage 13, thereby increasing or decreasing the area of the passage to such an extent that the quantity of liquid escaping may be easily controlled. In actual operation the chamber 3 may be filled with a suitable colored liquid, which is permitted to escape through passage 13 into chamber 4. It is here absorbed by a sponge or other absorbent material employed and is automatically applied to the line when this is unreeled, as the line passes directly through the chamber 4 before it can be unreeled. The pin 11 may be fastened to the surface of material which it is desired to line up and it is therefore only necessary to bring the line into contact with the surface to transfer the colored liquid thereto; for instance, by snapping the line when it is held comparatively taut. The line may be reeled whenever desired by unfolding the handle 7 and turning the same.

It can therefore be seen that the line will be coated with coloring material, both when reeling or unreeling the same. It is therefore maintained in a sufficiently moist condition to permit the colored liquid to be readily transferred when the line is in use.

Any suitable form of liquid may be employed and any color desired. I similarly wish it understood that any absorbent material may be employed, whether it be a sponge, wick, or the like; also, that the cord or marking line employed may be of any length desired. The chamber 3, containing the liquid, is filled by removing a screw 15, this screw serving the function of a plug or closure for the opening when the chamber has been filled. In the present instance, by referring to Figs. 1 and 2, it will be seen that the chambers 3 and 4 are closed by means of a circular cover plate 16. This plate is secured by means of screws 17 which enter lugs 18 formed in the chambers. Two of the lugs form a filler between the walls of the chambers to separate the same and one of the lugs is employed for the purpose of supporting the screw 14 which controls the flow of liquid from the chamber 3 to the chamber 4.

While a more or less specific structure is here shown, I wish it understood that the design and shape may be changed to suit varying conditions; similarly, that the materials and finish of the several parts employed may be such as the experience and judgment of the manufacturer may dictate.

Having thus described my invention, what I claim and desire to secure by Letters Patent is—

1. A device of the character described comprising a reel, a holder in which the reel is turnably mounted, there being an annular chamber formed in the holder exterior of the reel, partition members in said chamber dividing the chamber into two separate chambers, there being a pair of openings formed in the holder and communicating with one of the chambers, a marking line adapted to be received by the reel and having one end secured thereto, said line having its free end passing through said last named openings, means permitting filling of the chamber with a colored liquid, and means in said holder for delivering said liquid to the chamber through which the line passes to apply the liquid to the line.

2. A device of the character described comprising a reel, a holder in which the reel is turnably mounted, there being an annular chamber formed in the holder exterior of the reel, partition members in said chamber dividing the chamber into two separate chambers, there being a pair of openings formed in the holder and communicating with one of the chambers, a marking line adapted to be received by the reel and having one end secured thereto, said line having its free end passing through said last named openings, a filling opening formed in the holder in communication with the other chamber to permit introduction of a colored liquid, an absorbent material in the chamber through which the line passes, a passage formed in one of the partition members for delivering the liquid to the absorbent material to permit the liquid to be transferred or applied to the line when it is being unreeled, and means for regulating the quantity of liquid delivered.

3. A device of the character described comprising a reel, a holder in which the reel is turnably mounted, there being an annular chamber formed in the holder exterior of the reel, partition members in said chamber dividing the chamber into two separate chambers, there being a pair of openings formed in the holder in communication with one of the chambers, a marking line adapted to be received by the reel and having one end secured thereto, said line having its free end passing through said last named openings, a filling opening formed in the holder in communication with the other chamber to permit introduction of a colored liquid, an absorbent material in the chamber through which the line passes, a passage formed in one of the partition members forming communication between the two chambers, and a valve in said passage to regulate the quantity of liquid escaping therethrough.

4. A device of the character described comprising a cylindrical casing having a central chamber formed therein, a reel turnably mounted in said chamber, a pair of circumferentially arranged chambers formed in the casing exterior of the central chamber, a filling opening formed in the casing in communication with one of said chambers to permit introduction of a coloring medium, a closure for said opening, means in said casing permitting introduction of the coloring medium from the containing chamber to the second chamber, and a marking line carried by the reel, said line passing through said second named chamber.

5. A device of the character described comprising a casing having a central chamber formed therein and a pair of circumferentially arranged exterior chambers separated with relation to each other and the central chamber, a reel journaled in the central chamber, a marking line carried by the reel, and having one end secured thereto, the free end of said marking line passing through one of the circumferentially arranged chambers and through the outer wall of the casing, means permitting introduction of a coloring medium to the other circumferentially arranged chamber, and means permitting introduction of the coloring medium from said chamber to the chamber through which the marking line passes.

In testimony whereof I have hereunto set my hand in the presence of two subscribing witnesses.

WILLIAM F. GREGORY.

Witnesses:
C. WILLIAMSON,
JOHN J. DAILEY.